2 Sheets—Sheet 1.

T. J. & D. A. LINDSAY & W. J. MINER.
Combined Seed-Drill and Corn-Planter.

No. 210,262. Patented Nov. 26, 1878.

WITNESSES:
Henry N. Miller
C. Sedgwick

INVENTOR:
T. J. Lindsay
D. A. Lindsay
W. J. Miner
BY
ATTORNEYS.

2 Sheets—Sheet 2.
T. J. & D. A. LINDSAY & W. J. MINER.
Combined Seed-Drill and Corn-Planter.
No. 210,262. Patented Nov. 26, 1878.
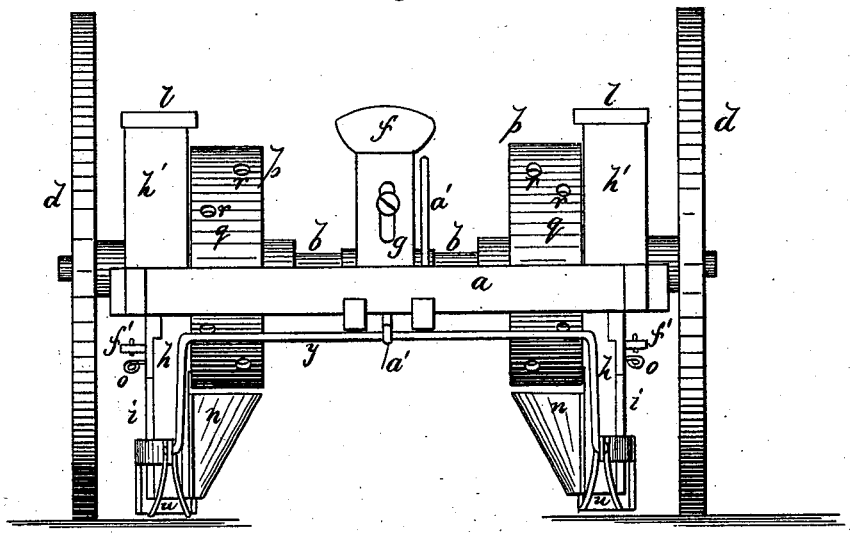
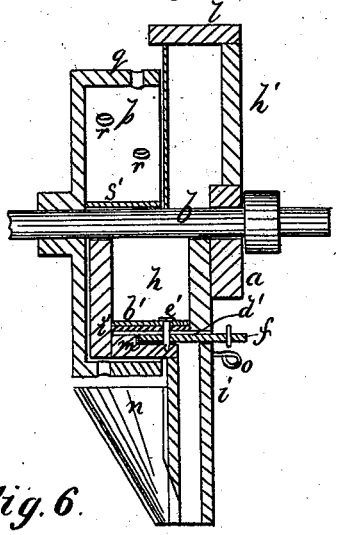
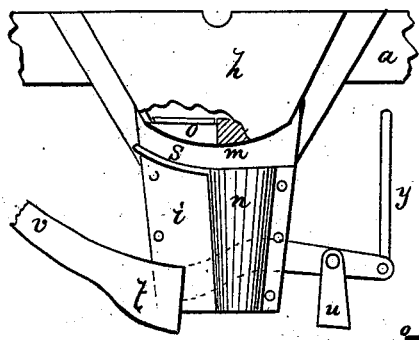
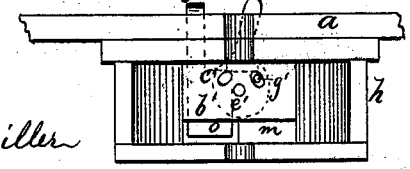
WITNESSES:
Henry N. Miller
C. Sedgwick
INVENTOR:
T. J. Lindsay
D. A. Lindsay
W. J. Miner
BY
ATTORNEYS.

UNITED STATES PATENT OFFICE.

THOMAS J. LINDSAY, DAVID A. LINDSAY, AND WILLIAM J. MINER, OF WINDFALL, INDIANA.

IMPROVEMENT IN COMBINED SEED-DRILL AND CORN-PLANTER.

Specification forming part of Letters Patent No. 210,262, dated November 26, 1878; application filed September 20, 1878.

*To all whom it may concern:*

Be it known that we, THOMAS JEFFERSON LINDSAY, DAVID ALPHUS LINDSAY, and WILLIAM JEFFERSON MINER, all of Windfall, in the county of Tipton and State of Indiana, have invented a new and useful Improvement in Combined Seed-Drill and Corn-Planter, of which the following is a specification:

Our invention relates to a machine for drilling seed or planting corn in two or more rows at once.

The invention will first be described in connection with the drawings, and then pointed out in the claim.

Figure 1:
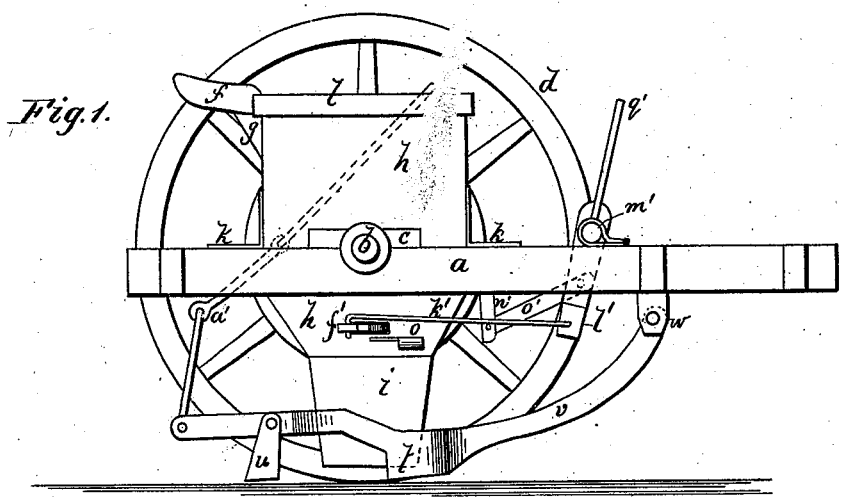
Figure 2:
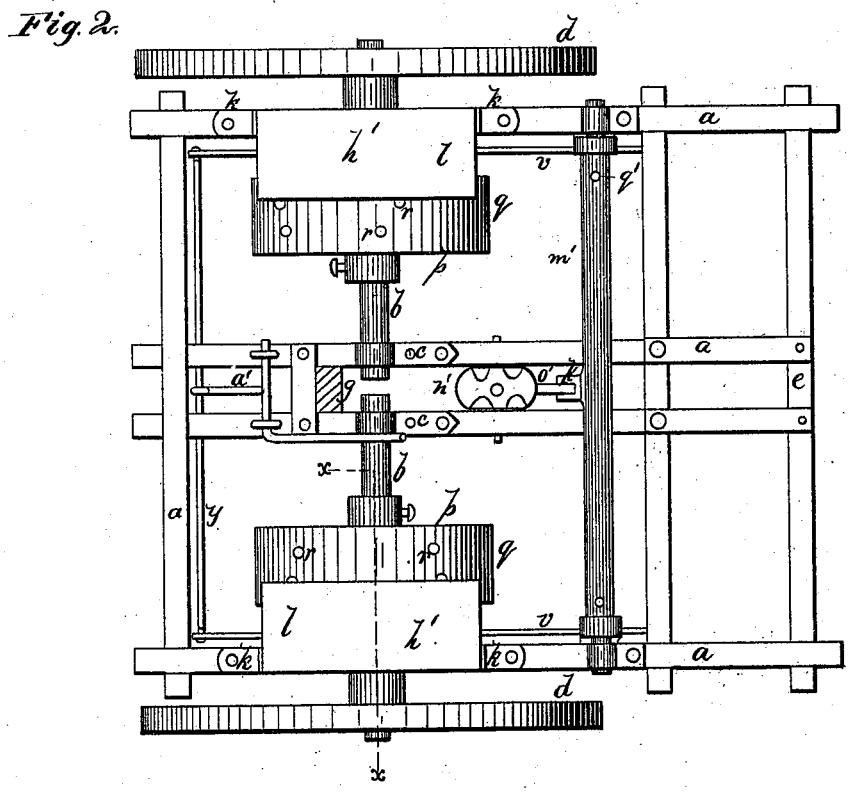

In the accompanying drawings, Figure 1 is a side elevation of our machine, with the near wheel removed. Fig. 2 is a plan, with the seat cut off. Fig. 3 is a rear elevation of the machine. Fig. 4 is a partial section at the line $x\ x$ of Fig. 2. Fig. 5 is a side view of one seed box and spout, partially broken open. Figs. 6 and 7 are detail views.

Similar letters of reference indicate corresponding parts.

$a\ a$ is the frame of the machine. The axle is made in two parts, $b\ b$, each part $b$ turning in boxes $c\ c$ on frame $a$. $d\ d$ are the wheels, attached to the axles by screws or keys, so that the axles and wheels turn together; but each axle and wheel is independent of the other. A pole (not shown) is to be attached at $e$. $f$ is the seat, supported on a standard, $g$, at the center of the machine.

The seed-boxes are attached to the frame $a$. They are in two parts, $h\ h'$, divided on line with the axle. The lower part, $h$, is in shape of a hopper, and terminates at its lower end in a spout, $i$, that runs to the ground. The upper part, $h'$, of each feed-box is above the axle, and is connected to frame $a$ by brackets $k$. It is rectangular in shape and narrower than the lower part, $h$, as shown, and has a cover, $l$, secured in any desired manner. The axles $b$ pass through the feed-boxes.

We have shown two feed-boxes, with devices for drilling or planting connected with each; but we do not limit ourselves to any particular number. A description of one feed-box and its connecting parts will apply to all the feed-boxes.

The bottom $m$ of the seed-box $h$ has two openings—one leading to the spout $i$, (see Fig. 4,) and the other leading to the spout $n$. (See Fig. 5.) The spout $n$ is attached at the inside of spout $i$, and opens into the lower end of spout $i$.

$o$ is a slide, fitted beneath the bottom $m$ of the seed-box, so that it may be moved in and out to open or close the opening from box $h$ into spout $n$. That opening will be closed when the machine is used for dropping corn, and opened when the machine is used for drilling, as next described.

Upon the axle $b$ is a flanged disk, $p$, forming a seed-cylinder, and revolving with the axle. The flanges or sides $q$ of the cylinder cover the inner side and bottom $m$ of the lower seed-box, $h$. The bottom side of box $h$ is rounded, so that the sides $q$ of the cylinder may revolve contiguous to the bottom $m$.

$r\ r$ are small circular openings or cavities in the sides $q$, that come successively beneath the opening in the bottom $m$ of the feed-box as the cylinder $p$ revolves. We make the holes $r$ in two rows, the holes in one row being made more numerous than in the other, so that by adjusting the cylinder $p$ on the axle the machine will drill a greater or less distance apart, according to which row of holes $r$ is used.

The seed will run from the box $h$, and be gathered by the openings or cavities $r$, which will carry the seed back and discharge it into spout $n$. A plate, $s$, (see Fig. 5,) projecting from the forward part of spout $n$ beneath the side $q$ of the cylinder, prevents the seed dropping from the openings $r$ until they come over the spout $n$. There is a plate, $s'$, resting upon the axle $b$ and over the portion of the box $h$ that is within the cylinder $p$.

$t$ is a plow for opening a furrow for the seed in front of the spout $i$, and $u$ are coverers behind the spout $i$ to cover the grain. The plow $t$ is upon an arm, $v$, hung at $w$ on the forward part of frame $a$, (see Fig. 1,) which arm $v$ extends to the rear of spout $n$, where the coverers $u$ are attached. The rear end of bar $v$ is connected with a cross-bar, $y$, to which all the plows and coverers of the machine are also attached, and the cross-bar $y$ is connected to the short arm of the elbow-lever $a'$, hung upon the frame of the machine. The long arm of the lever $a'$ extends up at the side of seat $f$, so that it may be operated by the driver to raise or lower the plows $t$ and coverers $u$.

When the machine is to be used for planting corn or other grain in hills, the parts next described will come into use.

The opening from the box $h$ into the spout $i$ is covered by a plate, $b'$, (see Figs. 4, 6, and 7,) which plate has two circular openings, $c'$, somewhat larger than the grain that is to pass through them. Beneath the plate $c'$ is a cut-off, $d'$, that is a circular disk set in flush with the bottom $m$, and held in place by a central pin, $e'$. An arm, $f'$, from the side of a cut-off, $d'$, extends through a long slot in the side of box $h$. The cut-off $d'$ has two orifices, $g'$, (see Fig. 6,) cut through it in such position that, as the cut-off is vibrated by moving the arm $f'$ back and forward, coincide alternately with the openings $c'$ of plate $b'$, and permit the grain to enter spout $i$ intermittently.

$i$ is a plate of rubber, (see Fig. 7,) attached on the under side of plate $b$, with openings coinciding with the holes $c'$, only smaller. These openings form an elastic edge to the holes $c'$, and prevent the cut-off $d'$ from cutting the grain.

The cut-off $d'$ is to be operated by the driver at the proper intervals to plant the grain in hills. For this purpose the arm $f'$ of the cut-off is connected by a rod, $k'$, (see Fig. 1,) to an arm, $l'$, on a rock-shaft, $m'$, that is fitted across the forward part of the machine.

$n'$ is a treadle, pivoted in frame $a$ in front of seat $f$, and connected by a rod, $o'$, to an arm, $p'$, from rock-shaft $m'$.

The treadle $n'$ is to be operated by the foot of the driver to oscillate the shaft $m'$, and thereby operate the cut-off $d'$ in each seed-box $h$ on the machine.

We provide a handle, $q'$, from shaft $m'$, by which handle the rock-shaft may be operated. This handle is intended to be used by a person riding on the machine especially for that purpose, when it is desirable that the driver should not operate the cut-off.

The grain, which passes through the cut-off $d'$ into spout $i$, enters a furrow made by plow $t$, and is covered by the coverers $u$. The slide $o$ will be pushed in when the machine is used for planting in hills to prevent the grain from entering spout $n$.

The construction above described permits the machine to be used for drilling or for planting in hills at will, without changing the parts.

The number of drilling-cylinders carried by each axle may be increased. We do not limit ourselves in that particular, nor to the exact details of construction set forth, as they may be varied without departing from our invention.

Having thus fully described our invention, we claim as new and desire to secure by Letters Patent—

The seed-boxes $h$ $h'$, divided horizontally on line with axle, the lower part, $h$, having spout and plate $s$, and a bottom provided with plate $b'$ $c'$, cut-off $d'$, and two openings, whereby it is adapted to operate as a planter, or with the perforated flanged cylinders $p$ as a drill, as shown and described.

THOMAS JEFFERSON LINDSAY.
DAVID ALPHUS LINDSAY.
WILLIAM JEFFERSON MINER.

Witnesses:
SAMUEL BARROW,
DAVID BARROW.